United States Patent [19]

Steigman et al.

[11] Patent Number: 5,865,206
[45] Date of Patent: Feb. 2, 1999

[54] PROCESS AND APPARATUS FOR BACKING-UP OR SUPPLEMENTING A GAS SUPPLY SYSTEM

[75] Inventors: Frederic Neal Steigman, Ossining, N.Y.; Ludo Jozef Corneel Couwels, Ranst, Belgium

[73] Assignee: Praxair Technology, Inc., Danbury, Conn.

[21] Appl. No.: 853,848

[22] Filed: May 9, 1997

[51] Int. Cl.[6] .................................................. G05D 11/02
[52] U.S. Cl. .............................. 137/7; 137/88; 137/114
[58] Field of Search .................................... 137/7, 88, 98, 137/100, 112, 113, 114, 93

[56] References Cited

U.S. PATENT DOCUMENTS

| | | | |
|---|---|---|---|
| 2,682,884 | 7/1954 | Schmidt | 137/88 |
| 4,148,311 | 4/1979 | London et al. | 137/111 X |
| 4,651,728 | 3/1987 | Gupta et al. | 128/201.28 |
| 5,313,973 | 5/1994 | Fabregat | 137/93 X |
| 5,674,382 | 10/1997 | Chapman | 137/93 X |

*Primary Examiner*—Stephen M. Hepperle
*Attorney, Agent, or Firm*—Robert J. Follett

[57] ABSTRACT

The invention is directed to a process for providing a gas having a minimum pressure and a composition that includes a major component to an end application, said process comprising the following steps:

a) providing a first gas having said major component in a first concentration to said end application;

b) providing means for measuring the pressure of said first gas being delivered to said end application;

c) providing a second gas having a second concentration of said major component of said first gas which exceeds said first concentration;

d) providing a third gas having a third concentration of said major component of said first gas which is less than said first concentration;

e) providing means for mixing said second and said third gases so as to produce a fourth gas at at least said minimum pressure and which has said major component in a fourth concentration; wherein, f) when said means for measuring the pressure of said first gas to be received at said end application detects a deficiency with respect to said minimum pressure, said deficiency is offset by the addition of said fourth gas.

20 Claims, 2 Drawing Sheets

PROCESS AND APPARATUS FOR BACKING-UP OR SUPPLEMENTING A GAS SUPPLY SYSTEM

FIELD OF THE INVENTION

The invention relates to a process and system for providing a gas having a substantially constant concentration of a selected component to an application, and more particularly to a process and system for backing up and/or supplementing gas supply systems.

BACKGROUND OF THE INVENTION

In recent years there has been increasing need for industrial gases, such as oxygen and nitrogen for example, in such diverse applications as steel making, aluminum production, pharmaceutical production and glass making. Although gases for such applications have conventionally been supplied by vaporizing liquid ("bulk") oxygen or bulk nitrogen stored on site in cryogenic storage vessels, it is often more cost effective to generate such gases using on-site vacuum and/or pressure swing adsorption (V/PSA) air separation systems or membrane air separation systems.

To assure uninterrupted gas supply, such on-site gas generating systems typically use vaporized liquid to replace (i.e. back up) the on-site generated gas in the event of a gas generating system outage due to electric power interruption, mechanical failure, etc. In addition, such liquid vaporizing systems are also used to supplement the on-site generated gas flow when the application's gas requirement exceeds on-site plant capacity. Unfortunately, compositional differences between the on-site generated gas and the back-up/supplemental vaporized liquefied gas can render the gas supply system unsuitable for some applications, thereby preventing them from realizing the lower costs associated with using on-site generated gases. When, for example, V/PSA oxygen product, which is typically between 90 and 95 volume percent (vol. %) oxygen (the balance being substantially nitrogen and argon), is backed up using liquid oxygen, which is typically at least 99.5 vol. % oxygen, the oxygen concentration in the product from the gas supply facility can suddenly change by between 4.5 and 10 vol. % during a V/PSA plant outage.

An example of an application where such a substantial or material change in oxygen concentration is unacceptable is in glass finishing. Such operations include glass forming, polishing, edge-firing, glazing and quartzworking, and typically use many oxy-fuel burners which are set up using manual combustion controls. In such operations the above described fluctuations in the oxygen concentration of the combustion oxidant can cause changes in flame temperature thereby influencing glass formability, and changes in flame stoichiometry, which affects the color of certain glasses. While it may be possible to adjust the ongoing combustion process to compensate for oxidant compositional changes, this is often operationally impractical due to numerous manual controls, a limited number of operator personnel, and/or little or no advanced notice of the oxidant change.

Thus there is a need in the art for a highly reliable, cost-effective means to back up or supplement non-cryogenic on-site gas supply systems serving composition-sensitive applications.

OBJECTS OF THE INVENTION

It is therefore an object of the invention to provide an improved system for backing-up or supplementing an on-site gas production facility.

It is a further object of the invention to provide such a system that ensures that the concentration of a selected gas component provided to an application is materially unchanged in the event that the backup/supplemental process is implemented.

A still further object of the invention is to provide a backup/supplemental system for gas composition-sensitive applications.

A still further object of the invention is to provide such a system that is reliable and cost effective.

With these and other objects in mind, the invention is hereinafter described in detail, the novel features thereof being particularly pointed out in the appended claims.

SUMMARY OF THE INVENTION

The invention comprises a process for providing a gas having a minimum pressure and a composition that includes a major component, to an end application. In particular, a preferred process comprises the following steps:

a) providing a first gas having said major component in a first concentration to said end application;

b) providing means for measuring the pressure of said first gas being delivered to said end application;

c) providing a second gas at at least said minimum pressure and having a second concentration of said major component of said first gas which exceeds said first concentration;

d) providing a third gas at at least said minimum pressure and having a third concentration of said major component of said first gas which is less than said first concentration;

e) providing means for mixing said second and said third gases so as to produce a fourth gas at at least said minimum pressure and which has said major component in a fourth concentration; wherein, f) when said means for measuring the pressure of said first gas to be received at said end application detects a deficiency with respect to said minimum pressure, said deficiency is offset by the addition of said fourth gas.

In a preferred embodiment the first gas comprises oxygen as said major component.

In another preferred embodiment, the second gas comprises oxygen, more preferably vaporized liquid oxygen.

In another preferred embodiment, the first gas comprises nitrogen as said major component.

In another preferred embodiment, the second gas comprises nitrogen, more preferably vaporized liquid nitrogen.

In other preferred embodiments, the third gas may be vaporized liquid nitrogen, vaporized liquid oxygen or vaporized liquid argon.

In other preferred embodiments, the first gas is oxygen product provided from a V/PSA system, or nitrogen product provided from a membrane system.

Another embodiment of the invention comprises a system for providing a gas having a minimum pressure and a composition that includes a major (i.e. selected) component, to an end application. In particular, a preferred system comprises:

a) means for providing a first gas having said major component in a first concentration to said end application;

b) means for measuring the pressure of said first gas being delivered to said end application;

c) means for providing a second gas at at least said minimum pressure and having a second concentration of said major component of said first gas which exceeds said first concentration;

d) means for providing a third gas at at least said minimum pressure and having a third concentration of said major component of said first gas which is less than said first concentration;

e) means for mixing said second and said third gases so as to produce a fourth gas at at least said minimum pressure and which has said major component in a fourth concentration; wherein, f) when said means for measuring the pressure of said first gas to be received at said end application detects a deficiency with respect to said minimum pressure, said deficiency is offset by the addition of said fourth gas.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

Figure 1:
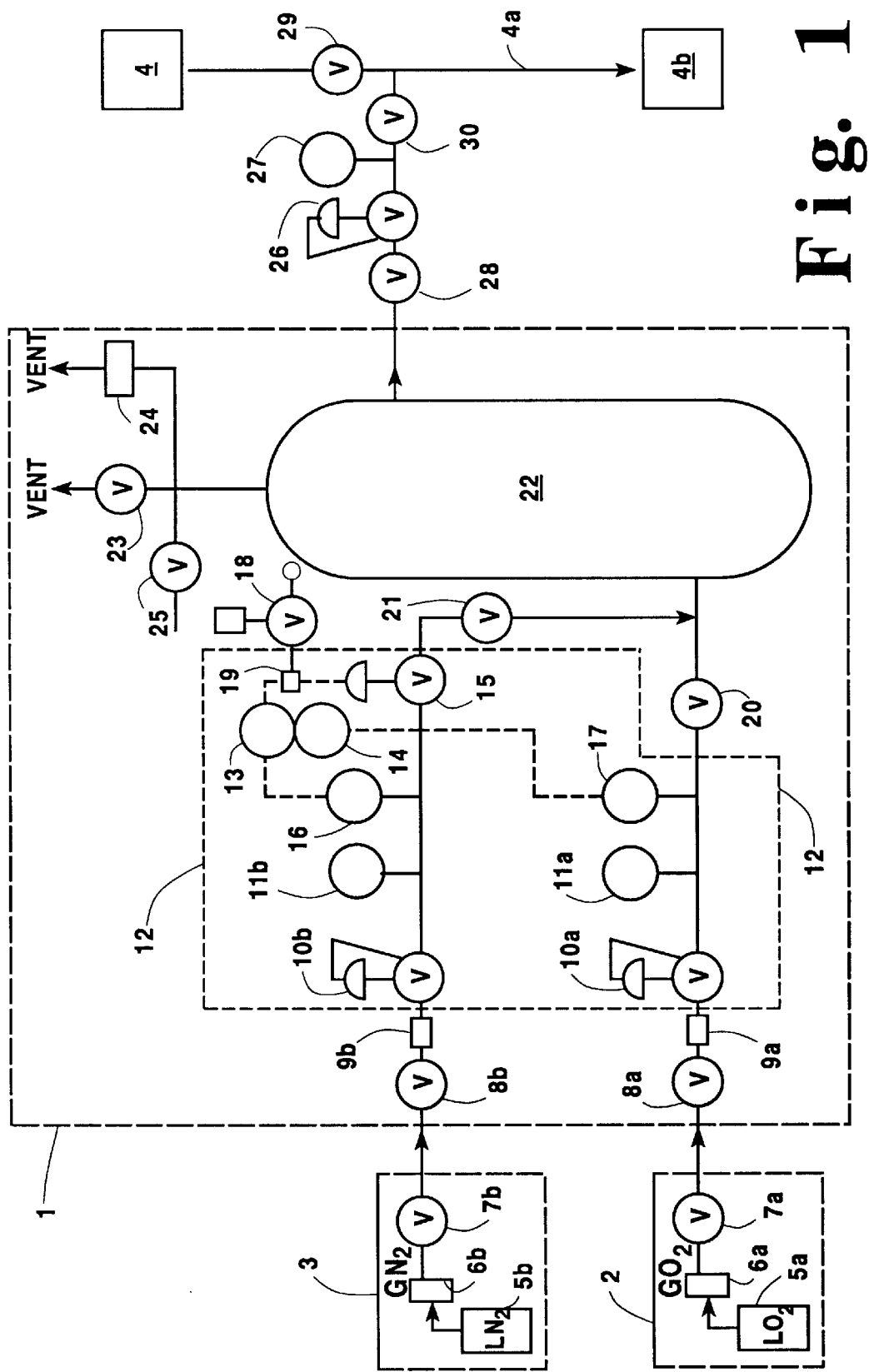
FIG. 1 is a schematic diagram of an embodiment of the invention showing a particular mode of operation for the inventive system.

The present invention modifies a conventional bulk liquid storage and vaporizing system backing up or supplementing a non-cryogenic on-site gas supply apparatus. This modification ensures that the pressure and the concentration of a selected gas component supplied to an application remains materially unchanged in the event the back-up/supplemental system is engaged. While the change in the concentration of the selected component may be easily minimized using the inventive system, those skilled in the art will appreciate that different end-use applications will generally have different sensitivities and that the degree to which the change in concentration must be minimized will therefore depend on the tolerance of the specific process. In one preferred embodiment, the change in oxygen concentration is less than 4.5 vol. % (e.g. less than the minimum change experienced with conventional V/PSA back-up or supplemental systems.)

In a particularly preferred embodiment, a V/PSA oxygen plant is supplemented with the usual bulk oxygen storage/vaporizing backup system and also with a small bulk nitrogen storage/vaporizing system and gas mixing equipment. Vaporized bulk nitrogen and vaporized bulk oxygen are mixed in proper ratio into a buffer tank to produce a gas having the nominal vol. % oxygen of the particular V/PSA oxygen product. This mixture is then piped to the inlet of a pressure regulator discharging into the pipeline delivering the V/PSA oxygen product to the gas application. This pressure regulator is set to deliver a pressure slightly below the nominal pressure of this pipeline. Thus, when there is total or partial loss of pipeline pressure caused by a V/PSA plant outage or insufficiency, flow of the mixed composition is automatically added into the pipeline as needed to restore the pipeline pressure.

Alternatively, the process and system of the invention may be used to back-up or supplement an air separation membrane nitrogen plant. Such plants are typically backed-up or supplemented by bulk nitrogen storage/vaporizing facilities. Those skilled in the art will appreciate that such systems may be modified in a way analogous to the V/PSA system modifications described above.

The system of the invention can supply the mixed composition gas to the end application over a wide range of desired pressures, depending upon the requirements of the end-use application in which the gas will be used. Such pressures may be generally in the range of from about 10 to about 210 psig, more typically from about 40 to 100 psig. The maximum gas pressure deliverable by the system is set by the operating pressures of the tanks supplying the bulk gases, which is typically about 210 psig although those skilled in the art will appreciate that cryogenic storage tanks with higher operating pressures are available.

A preferred system of the invention mixes vaporized liquid oxygen with vaporized liquid nitrogen to produce an oxygen or nitrogen rich gas. However, the invention is not limited to mixing of oxygen and nitrogen. For example, instead of nitrogen, either clean, dry, compressed air or vaporized liquid argon may be mixed with liquid purity vaporized oxygen to produce an oxygen rich gas. Likewise, either clean, dry, compressed air or vaporized liquid argon may be mixed with liquid purity vaporized nitrogen to produce a nitrogen rich gas.

It is noted that the latter embodiments are less preferred, as the use of compressed air as oxygen or nitrogen diluent gas involves extensive capital investment in air cleaning, compression and drying equipment, and possibly in electrical back-up equipment to assure the availability of compressed air when the V/PSA or membrane plant is disabled by a power interruption. Such capital investment would be idle the great majority of the time, making this alternative less cost effective. Use of vaporized liquid argon as diluent gas, unless required by the application, is also less preferred at present due to its substantial cost increment with respect to liquid oxygen or nitrogen.

We should note that by the term "oxygen rich" or "nitrogen rich" gas we mean a gas having an oxygen or nitrogen volume concentration of between about 22% to 100%, or between about 78% to 100%, respectively. For oxygen rich gases, it is preferable that the volume concentrations be greater than about 90% and less than 99.5%, most preferably between 90% and 95%. For nitrogen rich gases, it is preferable that the volume concentrations be between about 95% and 100%.

The gas mixing equipment of the present invention may utilize process gases at pressures just below the working pressure of the bulk liquid storage tanks, typically about 210 psig, thereby minimizing investment by permitting the gas mixing flow componentry to be relatively compact. Also, bulk gases storage and vaporizing facilities are typically simple, well-understood, and require little or no electric power. Gas-mixing equipment may be designed for simplicity and for control electric requirements that are easily backed up where needed, for example by a small, battery-powered, uninterruptable power supply (UPS). Therefore the inventive system satisfies the objectives of high overall reliability and minimum idle capital.

The invention will now be described with reference to the Figures.

A preferred apparatus for practicing the invention with respect to V/PSA oxygen plant backup is shown in FIG. 1. Overall, the diagram depicts the gas mixing apparatus 1 connected to vaporized liquid oxygen 2 and vaporized liquid nitrogen 3 sources respectively, to provide a backup or supplemental mixture to pipeline 4a containing gas from V/PSA plant 4 for an end use application 4b. It will normally be most practical to locate the gas mixing apparatus 1 adjacent to the bulk oxygen and nitrogen storage tanks 5a and 5b and vaporizer systems 6a and 6b, respectively. Gases provided from vaporizers 6a and 6b are typically at pressures of up to about 210 psig. Temperature protection valves 7a and 7b may be utilized in order to protect downstream gaseous flow components from dangerously low fluid temperatures, as might occur during a malfunction of the vaporizing facilities 6a and 6b.

The gas mixing apparatus 1, will now be described in greater detail. Valves 8a, 8b, and 30 may be used to isolate the gas mixing equipment from the vaporizing systems and the pipeline for e.g. maintenance purposes. Filters 9a and 9b are used to remove any dust or other solids that might disrupt the operation of downstream flow components. The gas ratio control system illustrated in Box 12 utilizes feedback loop control and operates in the manner described below.

Pressure regulators 10a and 10b are used together with pressure indicators 11a and 11b, to establish, respectively, the design oxygen and nitrogen gas pressures of the downstream ratio-control components. Flow rate controller 13 with ratio control 14, manipulates automatic valve 15 to bring the signal from nitrogen flowrate transmitter 16 to the needed value, as internally calculated using the signal from oxygen flowrate transmitter 17 and a preprogrammed flowrate ratio.

This ratio may be easily determined by those skilled in the art. A non-limiting example for the production of an oxygen/nitrogen gas mixture having 92 vol. % oxygen is hereinafter explained. Treating the vaporized liquid oxygen and nitrogen gases as pure substances, the desired nitrogen/oxygen flowrate ratio is given by: (100/Cm)−1, where the flowrates are volumetric referred to the same standard temperature D-20,36410 and pressure (STP), and Cm is the desired vol. % oxygen in the mixture. Thus, a mixture having 92 vol. % oxygen is made using 0.087 standard volumes of nitrogen per standard volume of oxygen.

Returning to FIG. 1, all signals of the diagramed gas mixing apparatus are electrical, excepting that automatic valve 15, as illustrated, is gas-operated using vaporized liquid nitrogen supplied through three-way valve 18 to the current-to-pressure transducer 19. This instrument nitrogen supply is assured, and the system's control power requirements are minimal, and may be easily backed up via a UPS where needed.

The temperatures of the vaporized liquid oxygen and nitrogen entering the gas mixing device may be affected by ambient conditions, by the design and utilization pattern of vaporizing systems 7a and 7b, and by the instantaneous oxygen and nitrogen flowrates. To help achieve stable mixture composition where such temperature changes are expected, the ratio-control system illustrated in Box 12 must properly account for the inlet temperatures of the oxygen and nitrogen gases. In particular, flowrate transmitters 17 and 16 may be massflow devices, such as those operating on coriolis, thermal, or ultrasonic principles. Alternatively, they may be supplemented by temperature transmitters, and computed flowrates temperature-compensated down to the temperature at which protection valves 7a and 7b are set (typically about minus 30 degrees Fahrenheit). In another embodiment, the output signal from an oxygen analyzer sampling the mixture delivered from buffer tank 22 may be used to automatically and continuously correct the flowrate ratio setpoint of ratio controller 14 as needed to control mixture composition, thereby offsetting flow measuring errors resulting from gas temperature changes.

Check valves 20 and 21 are intended to prevent any cross-contamination of the oxygen and nitrogen supply systems. Buffer tank 22 reduces any transients or fluctuations in pressure or composition of mixture delivered by the tank, as compared to those delivered into the tank by the ratio-control system. The tank is protected against over pressure by relief valve 23 and, where needed, by bursting disk 24. Valve 25 enables buffer tank product to be withdrawn through an oxygen analyzer for monitoring/adjusting purposes. Valve 25 may also be used to vent mixture to atmosphere in order to enable the gas mixer to be set up and/or tested off-line.

The mixture delivered by the gas mixer is connected to V/PSA pipeline 4 through pressure regulator 26. Utilizing pressure indicator 27, pressure regulator 26 is adjusted to maintain a delivery pressure just below the nominal pressure in V/PSA pipeline 4, which is typically in the range of 40 to 100 psig. A loss of pressure in pipeline 4a therefore triggers pressure regulator 26 such that mixed gas from buffer tank 22 is provided to the pipeline 4a. Thus the relatively expensive liquefied gases are used to make mixture only when the pipeline pressure drops because the V/PSA oxygen plant is making insufficient product, or goes off-line. The flow componentry of the gas mixing apparatus is sized to have the needed mixture capacity utilizing the available pressure differential between the bulk storage tanks and the V/PSA pipeline. Check valves 28 and 29 are intended to prevent any cross-contamination of the V/PSA and gas mixer flows.

Figure 2:
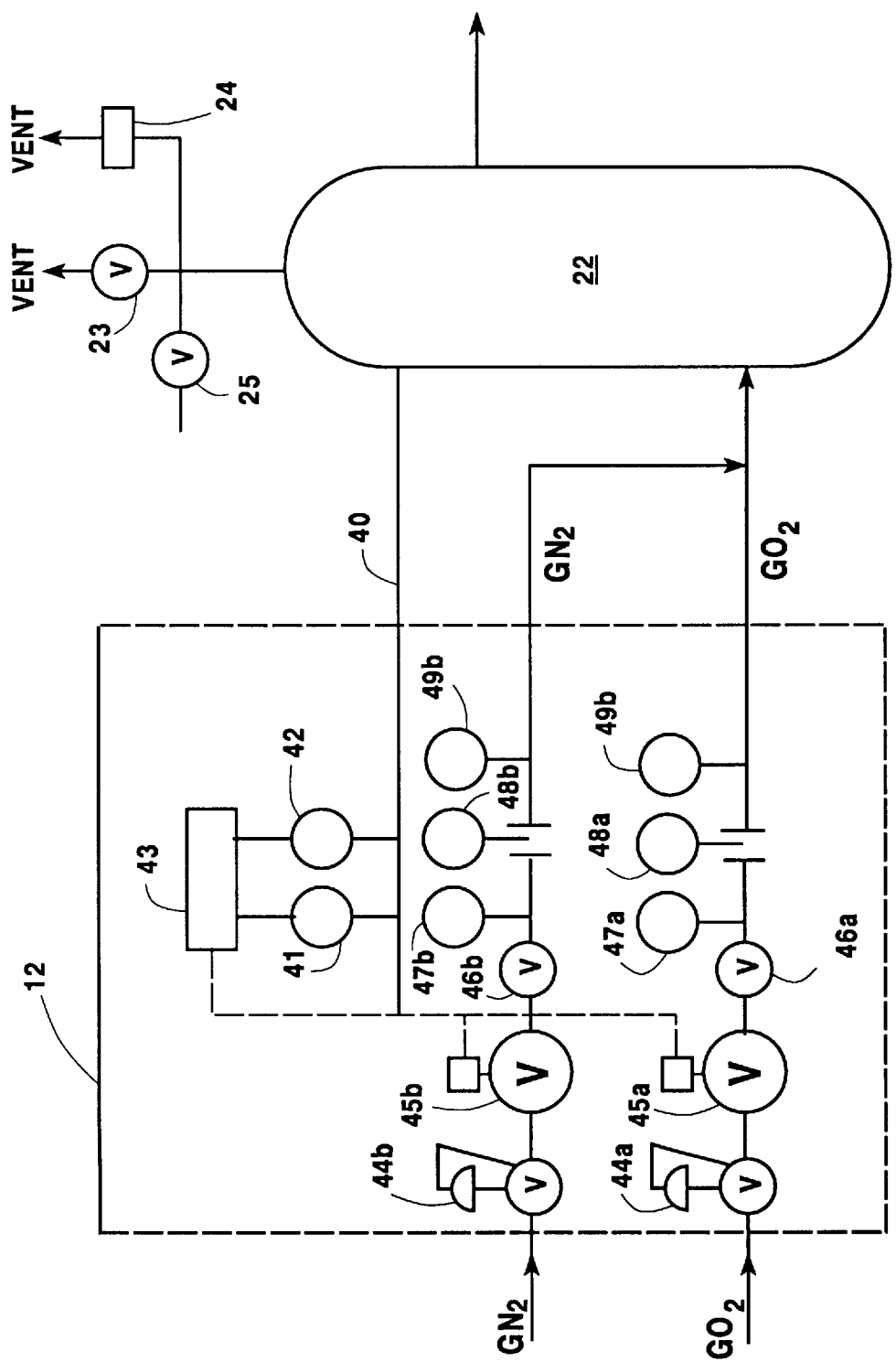
FIG. 2 is a schematic diagram of an embodiment of the invention showing an alternative mode of operation for the inventive system.

A less preferred embodiment is shown in FIG. 2. FIG. 2 details an alternative system to the ratio control system illustrated in Box 12 of FIG. 1. Note that the features numbered 22–25 in FIG. 2 function in the same manner as in the embodiment of FIG. 1, and are merely included for completeness.

In this less preferred system, each of the two gases to be mixed flows through a restricting orifice and into the buffer tank, and the flow ratio, once established, is maintained by fixing the upstream and downstream pressures at each flow restrictor. In particular, pressure regulators 44a and 44b maintain the gas pressures into flow orifices 48a and 48b, respectively. The gases discharged from the flow orifices mix into buffer tank 22, whose pressure is held within a range set by the differential action of high-limit pressure switch 41 and low-limit pressure switch 42 in conjunction with solenoid valves 45a and 45b. In particular, pneumatic signal line 40 transmits the pressure of buffer tank 22 to pressure switches 41 and 42. Switch 41 allows solenoid valves 45a and 45b to close when the high pressure setpoint is reached, while switch 42 allows solenoid valves 45a and 45b to open when the low pressure setpoint is reached. In backing up an on-site V/PSA oxygen plant, for example, the equipment of FIG. 2 is set up using an oxygen analyzer connected to e.g. valve 25 while oxygen/nitrogen mixture is vented to atmosphere from buffer tank 22; flow restrictors 48a and 48b and/or delivery pressures from pressure regulators 44a and 44b are then adjusted to establish the preselected oxygen concentration in the mixture. In subsequent operation, oxygen and nitrogen gases will then flow in the proper ratio into buffer tank 22 whenever buffer tank pressure has been drawn down by the application. Check valves 46a and 46b prevent cross-mixing of oxygen and nitrogen gases. Status lights in panel 43 and pressure indicators 47a, 47b, 49a and 49b are used to monitor the process.

The apparatus of FIG. 2 is less preferred because, when placed in service after the initial setup using the procedure outlined above, it will exhibit a tendency for the inlet gas flows (referred to STP) to vary in approximate inverse proportion to the square root of their respective absolute temperatures (a gas density effect). Thus, for example, when the temperature of a vaporized bulk gas at the less preferred apparatus changes to 30° F. from 90° F. (i.e. to 490° from 550° on the Rankine absolute temperature scale), the flowrate (referred to STP) for given pressures upstream and downstream of a given restricting orifice would tend to increase by approximately 5.9%. Depending on material of construction and temperature change, thermal contraction of the flow restricting orifice will tend to somewhat offset this density effect. With respect to the massflow control apparatus of FIG. 1, the simpler, less preferred apparatus of FIG. 2 cannot automatically compensate for post-setup gas temperature changes, and should be selected only after an analysis of the expected temperature effects suggests that the apparatus will satisfy the acceptable compositional tolerance of the particular application.

The above embodiments are not intended to be limiting. For example, similar systems may be used, as will be recognized by those skilled in the art, to back-up a nitrogen membrane system. Further implementations applicable to backup of either V/PSA oxygen plants or membrane nitrogen plants using oxygen as the major or minor mixture component, respectively include: a) using a loop controller and the output signal of an oxygen analyzer to manipulate a flow control valve for the major or minor gas to control mixture concentration without any intermediate flowrate ratio control, and; b) monitoring the mixture oxygen concentration using an oxygen analyzer, and alarming where applicable.

Still other implementations of the process may, for example, include: a) replacing pressure regulator 26 with a pressure-control system comprising a pressure transmitter, automatic pressure-control valve, and loop controller, and; b) adding bypass valving to automatically divert vaporized major component around the gas mixing apparatus during a mixer malfunction more injurious to the application than reverting to bulk purity. Other implementations may occur to those skilled in the art.

It should be noted that the gas quantity, flow rate and compositional requirements for a given application will vary depending upon the application. The inventive system provides flexibility in this respect. As a particular example, the inventive system is useful in glass finishing processes where oxygen supply system requirements range between about 5,000 and 45,000 standard cubic feet per hour flow at between about 40 and 100 psig pressure and at an oxygen concentration of about 90 to 95 vol. %.

Additional flexibility is provided in that where product from a V/PSA or membrane supply system serves multiple applications at a given site, the apparatus of the invention need not be sized or applied in connection with any of said applications not adversely affected by expected compositional changes. Again, however, the system of the invention provides a simple, reliable and cost effective method for backing up or supplementing any type of on-site gas supply system including, but not limited to, V/PSA oxygen and membrane nitrogen plants.

The following is a non-limiting example directed to a V/PSA on-site system.

EXAMPLE

If a V/PSA oxygen plant will deliver oxygen product having an oxygen concentration of 92% volume percent, then a gas mixing system using bulk nitrogen as diluent gas will utilize, according to the equation under above description of FIG. 1, approximately 8.7 standard cubic feet (SCF) gaseous nitrogen per 100 SCF gaseous oxygen, where the nitrogen and oxygen gases are assumed for the present purposes to be pure substances. An application utilizing 25,000 SCF per hour (SCFH) oxygen flow would then utilize about 2175 SCFH gaseous nitrogen during V/PSA backup. Thus a standard 900 gallon liquid nitrogen storage tank (net capacity approx. 82,500 SCF nitrogen) could supply such a nitrogen requirement for about 38 hours.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A process for providing a gas having a minimum pressure and a composition that includes a major component to an end application, said process comprising the following steps:

a) providing a first gas having said major component in a first concentration to said end application;

b) providing means for measuring the pressure of said first gas being delivered to said end application;

c) providing a second gas having a second concentration of said major component of said first gas which exceeds said first concentration;

d) providing a third gas having a third concentration of said major component of said first gas which is less than said first concentration;

e) providing means for mixing said second and said third gases so as to produce a fourth gas at at least said minimum pressure and which has said major component in a fourth concentration; wherein, f) when said means for measuring the pressure of said first gas to be received at said end application detects a deficiency with respect to said minimum pressure, said deficiency is offset by the addition of said fourth gas.

2. The process according to claim 1, wherein said first gas comprises oxygen as said major component.

3. The process according to claim 1, wherein said first gas is oxygen enriched air having an oxygen concentration between 22 and 99 vol. %.

4. The process according to claim 2, wherein said oxygen is present in an amount selected between 90 and 95 vol. %.

5. The process according to claim 1, wherein said first gas is provided from a non-cryogenic supply system.

6. The process according to claim 1, wherein said first gas is oxygen product provided from a gas supply system utilizing vacuum and/or pressure swing adsorption.

7. The process according to claim 1, wherein said second gas comprises oxygen as said major component.

8. The process according to claim 7, wherein said oxygen is present in an amount selected to be greater than 95 vol. %.

9. The process according to claim 1, wherein said second gas is vaporized liquid oxygen.

10. The process according to claim 1, wherein said third gas is vaporized liquid nitrogen.

11. The process according to claim 1, wherein said third gas is vaporized liquid argon.

12. The process according to claim 1, wherein said third gas is compressed air.

13. The process according to claim 1, wherein said first concentration differs by less than 4.5 vol. % from said fourth concentration.

14. The process according to claim 1, wherein said end application has a tolerance with respect to how much said first concentration and said fourth concentration may differ from each other, and wherein said fourth concentration and said first concentration are within said tolerance.

15. The process according to claim 1, wherein said end application is glass finishing.

16. The process according to claim 1, wherein said major component is nitrogen.

17. The process according to claim 16, wherein first concentration is greater than about 95 vol. % and less than 100 vol. %.

18. The process according to claim 1, wherein said first gas is nitrogen produced from the separation of air via a membrane system.

19. A system for providing a gas having a minimum pressure and a composition that includes a major component to an end application, said system comprising:
   a) means for providing a first gas having said major component in a first concentration to said end application;
   b) means for measuring the pressure of said first gas being delivered to said end application;
   c) means for providing a second gas having a second concentration of said major component of said first gas which exceeds said first concentration;
   d) means for providing a third gas having a third concentration of said major component of said first gas which is less than said first concentration;
   e) means for mixing said second and said third gases so as to produce a fourth gas at at least said minimum pressure and which has said major component in a fourth concentration; wherein, f) when said means for measuring the pressure of said first gas to be received at said end application detects a deficiency with respect to said minimum pressure, said deficiency is offset by the addition of said fourth gas.

20. The system of claim 19, wherein said means for providing a first gas having said major component in a first concentration to said end application is a non-cryogenic air separation system.

* * * * *